(12) United States Patent
Donze et al.

(10) Patent No.: US 6,534,739 B2
(45) Date of Patent: Mar. 18, 2003

(54) OXYGEN CUTTING OF SLABS

(75) Inventors: Valérie Donze, Liverdun (FR); Pascal Donze, Nancy (FR); Bertrand Donze, Dugny (FR); Thierry Rozot, Thorey Lyautey (FR)

(73) Assignee: Eon Holding S.A., Luxembourg (LU)

( * ) Notice: Subject to any disclaimer, the term of this patent is extended or adjusted under 35 U.S.C. 154(b) by 150 days.

(21) Appl. No.: 09/921,969

(22) Filed: Aug. 3, 2001

(65) Prior Publication Data

US 2002/0017506 A1 Feb. 14, 2002

(30) Foreign Application Priority Data

Aug. 4, 2000 (EP) .............................. 00202767

(51) Int. Cl.$^7$ .............................................. B23K 10/00
(52) U.S. Cl. ........................ 219/121.39; 219/121.44; 219/121.59; 219/121.48; 219/121.58; 266/48; 266/50; 148/120
(58) Field of Search ................. 219/121.39, 121.44, 219/121.59, 121.58, 121.45, 121.46, 121.48; 266/48, 51, 50; 148/9 R

(56) References Cited

U.S. PATENT DOCUMENTS

| 4,175,729 A | * | 11/1979 | Karlsson | 266/51 |
| 4,315,618 A | * | 2/1982 | Pawlowski | 266/69 |
| 4,923,527 A | * | 5/1990 | Ludwigson | 149/9 R |
| 5,198,178 A | | 3/1993 | Lotz et al. | |

FOREIGN PATENT DOCUMENTS

| EP | 0827920 | 3/1998 |
| EP | 0893372 | 1/1999 |
| FR | 2746686 | 10/1997 |

* cited by examiner

Primary Examiner—Mark Paschall

(57) ABSTRACT

The invention involves a process for the oxygen cutting of slabs—using one or more oxygen cutting torches—and a device for implementing the process. The process includes the steps of hanging the slab (16) using one or more electromagnets (14) separated from the slab (16) by a non-magnetic device or medium (such as air); causing a relative motion between the cutting torches (18) and the slab (16); using a carrying device (15) acting on the slab on the same side of the slab (16) as the electromagnet (14); and activating the cutting torch (18) in order to cut the slab (16) when it is transported past the cutting torch (18).

15 Claims, 4 Drawing Sheets

OXYGEN CUTTING OF SLABS

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The invention relates to a process for the oxygen cutting of slabs and to a device for implementing this process.

It is common to oxygen cut large-sized slabs coming from continuous castings so as to form smaller slabs corresponding to specific lamination programs.

Large slabs, called mother-slabs, can be cut:

a) lengthwise by an operation called resplifting, in x slabs of equal length;

b) lengthwise via an operation called derivation designed to eliminate defects like rough edges; and c) transversally via an operation called sectioning.

These oxygen cutting methods imply heavy handling, hazardous effects, and a very expensive working site, since the working site must be equipped with sufficient means of handling and engineering the slabs, as well as strong supports for the slabs as they are cut. All of this requires concentrating these operations in oxygen cuffing-specific areas.

It is usual to set up oxygen cutting sites by placing the slabs to be cut in various positions, namely:

horizontally on fixed supports using mobile cutting torches; or horizontally or on edge moving on a roller-table with fixed cutting torches.

All currently known solutions are bound to disturbances (slag, smokes etc.), supporting investments, and handling in order to remove beads, etc.

BRIEF SUMMARY OF THE INVENTION

Briefly, the process of the present invention uses one or more oxygen cutting torches to cut of slabs. The process comprises the steps of: hanging the slab using one or more electromagnets separated from the slab by a non-magnetic means (such as air); inducing relative motion between the cutting torches and the slab using a carrying device acting on the slab on the same side as the electromagnet; and activating the cutting torch to cut the slab as it comes past the cutting torch.

The device for implementing the process of the invention comprises a slab carrying structure, at least one oxygen cutting torch, and one or more electromagnets attached to the carrying structure and aligned in the moving direction of the slab to suspend a slab above the ground. One or more motorized rollers are arranged in the direction of the slabs' transportation with their axis parallel to the direction of transport, to make contact with the slab so as to move the slab in front of the cutting torch. A non-magnetic device, means, or medium is adjacent each of the electromagnets and designed to maintain a certain distance between the electromagnet and a slab.

Briefly, the oxygen cutting process of the present invention resides in hanging the slab to be oxygen cut using electromagnets from a carrying device, such as a semi-gantry, a gantry or a rolling-bridge, or even a customized device, in order to move the hanging slab against motorized rollers—or any other transporting mechanical device—in front of cutting torches and fixed tubes (for deburring, granulating and vacuuming) which are arranged on both sides of an oxygen cutting machine.

As regards horizontally-moved slabs, the cutting torch(es) is/are bent and placed underneath the slab. The slab is cut from bottom to top so as to enable an easier positioning of the deburring, granulating and vacuuming devices. A reversed positioning is also possible.

As regards vertically-moved slabs, the positioning of cutting torches and evacuation systems (deburring-device, granulator, vacuums) is simpler and control proves easier.

The system of the present invention can be adapted to existing handling means in a factory, as well as be specially constructed over a storage-area for the slabs, where the slabs can both be handled and cut.

The system provides room for machines with vertical slabs hung to the frame, providing very easy access on both sides of the slab to cut and to deburr the slab. It also allows for processing the slabs in a horizontal position with bent cutting torches enabling the slabs to be cut from bottom to top so that the slag/granulator and the evacuation device can easily find its place.

The concept of magnetic suspension directing the slabs' movement along the frame enables the processing of bent slabs. The basis of the slabs' dimensions remains constant (a straight line tangent to the rollers), which permits conforming of oxygen cutting programs and alignment of cutting torches and deburring-devices without any possible mistake or waste of time.

The system enables a very high productivity on the oxygen cutting site, since no time is wasted in handling, cleaning or similar tasks. The supplying and carrying of cut slabs are executed quickly. Contrary to all installations known today, there is no interruption of the production to clean the site, due to the easy access enabling to avoid the forming of burrs and to evacuate the slag as it is produced.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what we presently believe is the best mode of carrying out the invention.

Figure 1A:
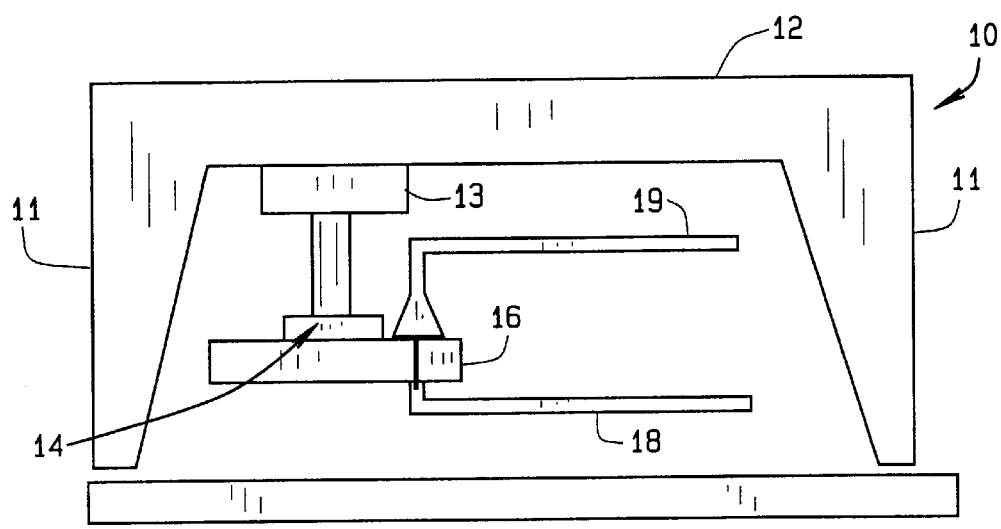
FIGS. 1A and 1B are schematic representations in vertical projection and from the top, of a way of implementing the invention representing the oxygen cutting of a slab in a horizontal position.
Figure 1B:
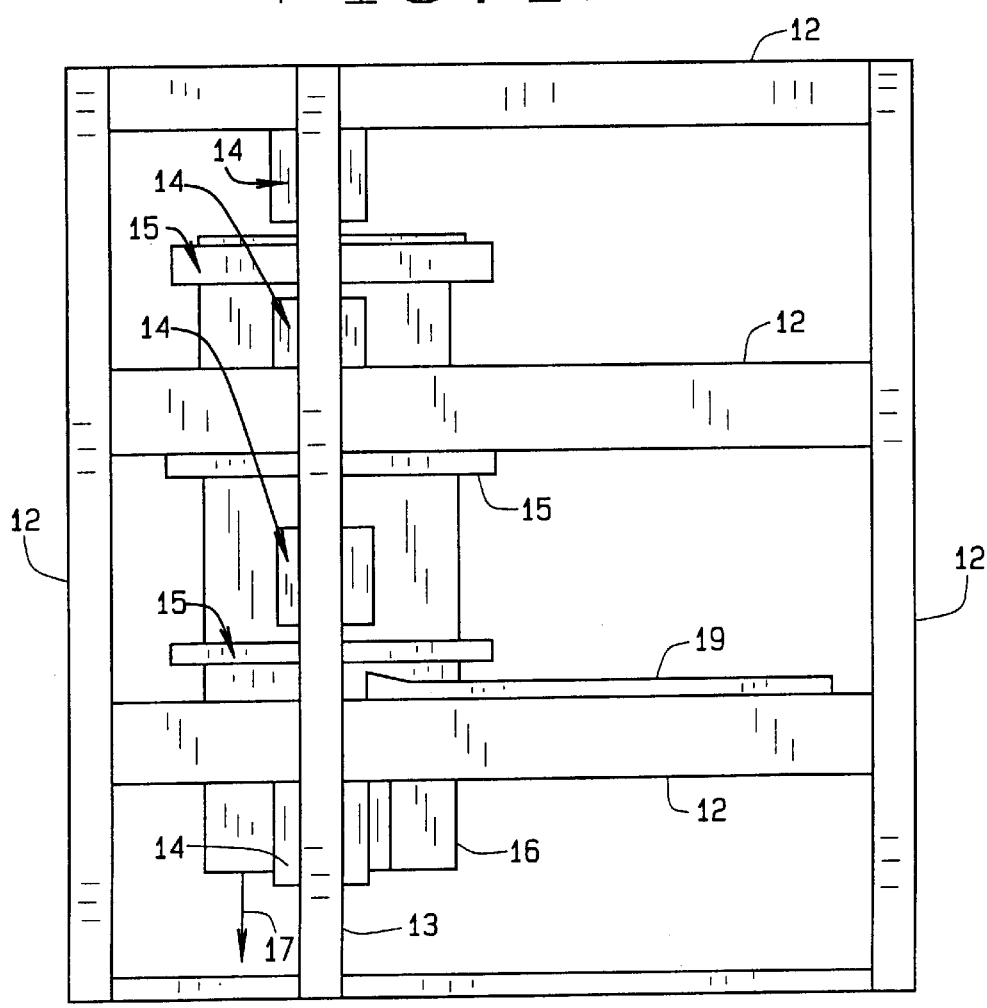

FIG. 1 represents a mode of oxygen cutting according to the invention in a horizontal position. A carrying structure (10) in the shape of posts (11) and rails (12) supports a carrying element (13) to which are attached, by cables, wires or other means, electromagnets (14) and motorized drive-rollers (15) for the slabs. The rollers (15) alternate with the electromagnets (14). The slab (16) is carried by one or more electromagnets (14) in service along the work-track indicated by arrow 17. The motorized rollers (15) touch the slab (16) and are driven in a rotating motion to move the slab (16) by friction. The motorized rollers (15) can also be magnetized by a permanent magnet or by a programmable electromagnet (not shown).

Along the work-track indicated by arrow 17, the slab passes between an oxygen cutting torch (18), shown bent in FIG. 1, and an evacuation device (19) for removing smoke and slag or for deburring. Pieces of finished slab are obtained once the slab (16) has been thoroughly processed by the cutting torch (18).

According to needs, that is according to the desired width of the pieces or sections cut from the slab, two or more of the cutting torches (18) and the evacuation device (19) can be used.

Figure 2A:
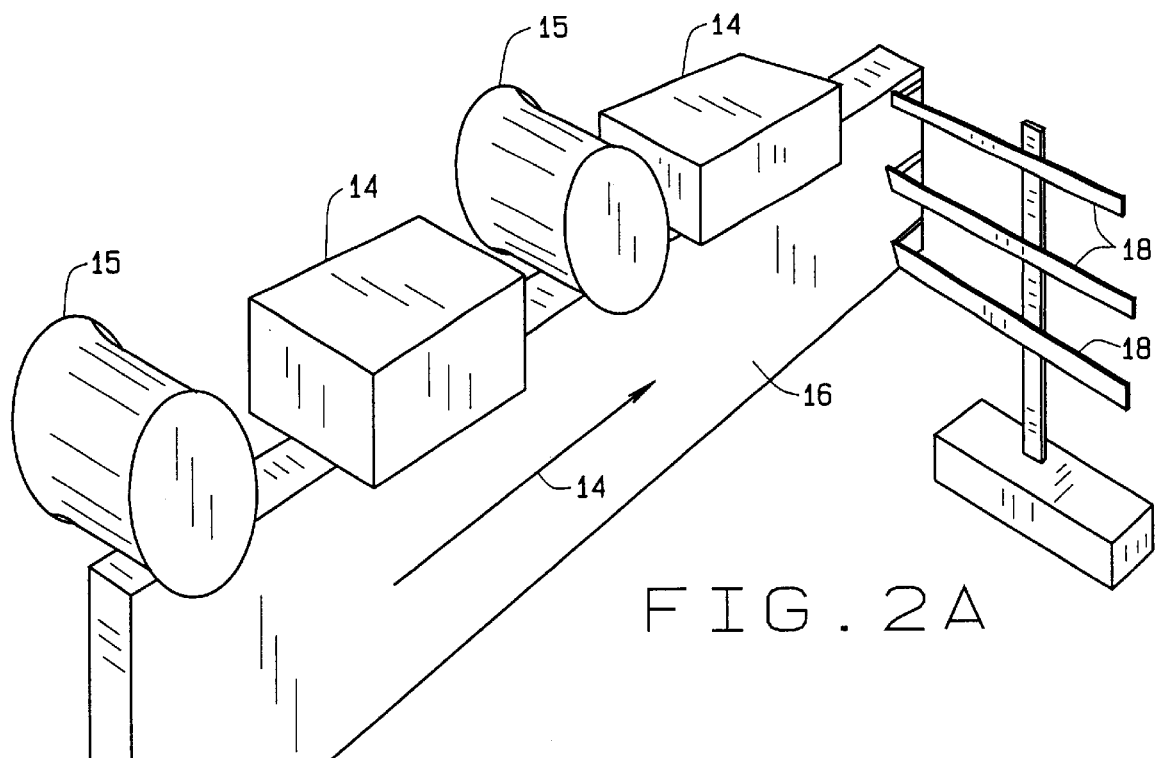
FIGS. 2A and 2B are schematic representations in perspective of another way of implementing the invention in a vertical position.
Figure 2B:
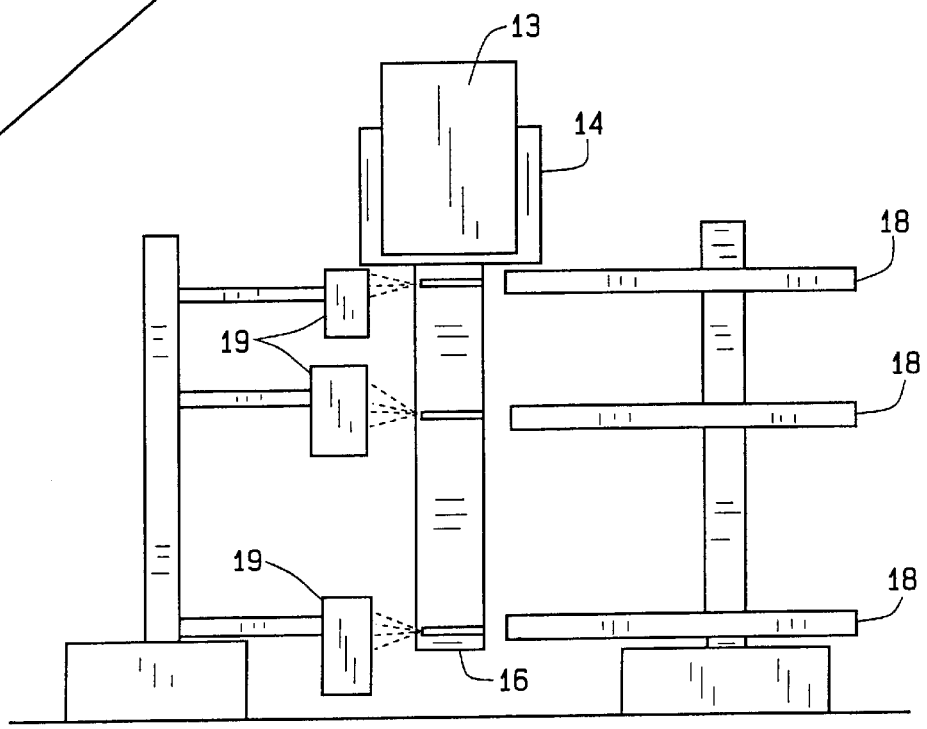

FIGS. 2A and 2B represent, in a schematic way, in perspective and from the top, the oxygen cutting of a slab (16) in a vertical position attached to electromagnets (14) and driven by motorized rollers (15) in the direction indicated by arrow 17. The slab (16), suspended in a vertical position, passes between the cutting torches (18) and the evacuation of smoke and slag device, and the deburring device (19).

In both ways of carrying the slab (16), that is in a flat or horizontal position or in a vertical position, the cooperation between the electromagnets (14) and the motorized rollers (15), and the positioning of the motorized rollers (15) so that there is an air gap between the surface of the electromagnet and the adjacent side of the slab (16), enables the slab (16) to move as shown by arrow 17.

Figure 3:
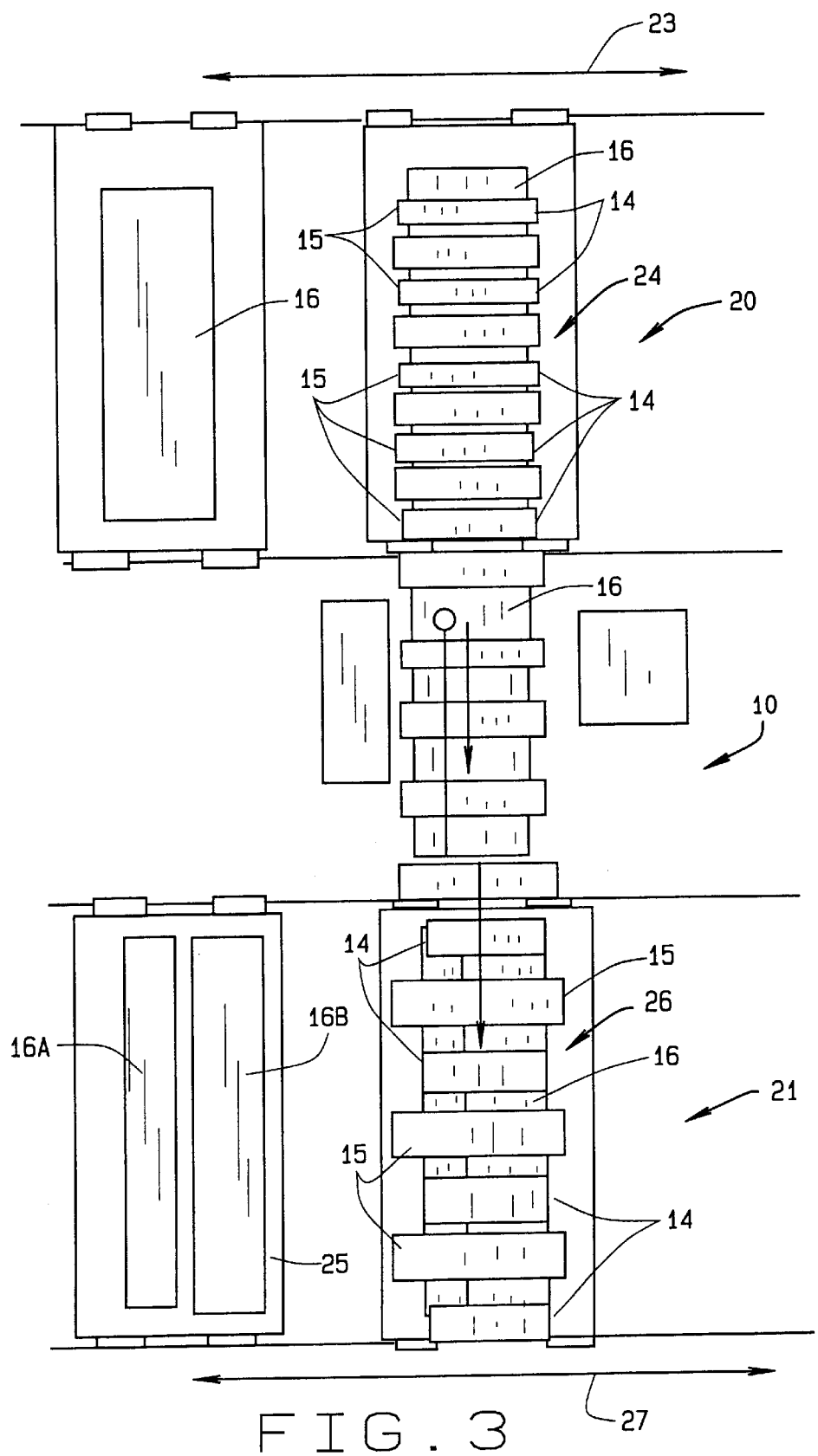
FIG. 3 is a schematic representation of a more complete installation for implementing the oxygen cutting of slabs according to the invention, in the case of a horizontally set slab.

FIG. 3 represents in a schematic way a full installation of oxygen cutting of slabs, having, at the center a cutting structure or site (10), at the top, a supplying unit (20) for the slabs (16), and at the bottom a unit 21 for removing slabs (16).

The supplying unit (20) includes a cart 22 moving as indicated by the double-arrow 23 to bring slabs (16) to be cut, and a supporting and carrying installation (24) designed to transport the slabs up to the oxygen cutting site (10). The installation (24) includes electromagnets (14) and motorized rollers (15) alternating along the transportation line up to the oxygen cutting site. The above is similar to the electromagnets and motorized rolls described in relation to FIG. 1.

The unit 21 for removing slabs (16) also includes of a cart (25) moving as indicated by arrow 27, for transporting the cut-up slabs (16A, 16B) and a supporting and carrying installation (26) to transport the slabs (16) out of the oxygen cutting site. The installation (24) also includes electromagnets (14) and motorized rollers (15), alternating along the transportation line to transport the cut-up slabs (16) out of the oxygen cutting zone.

Figure 4:
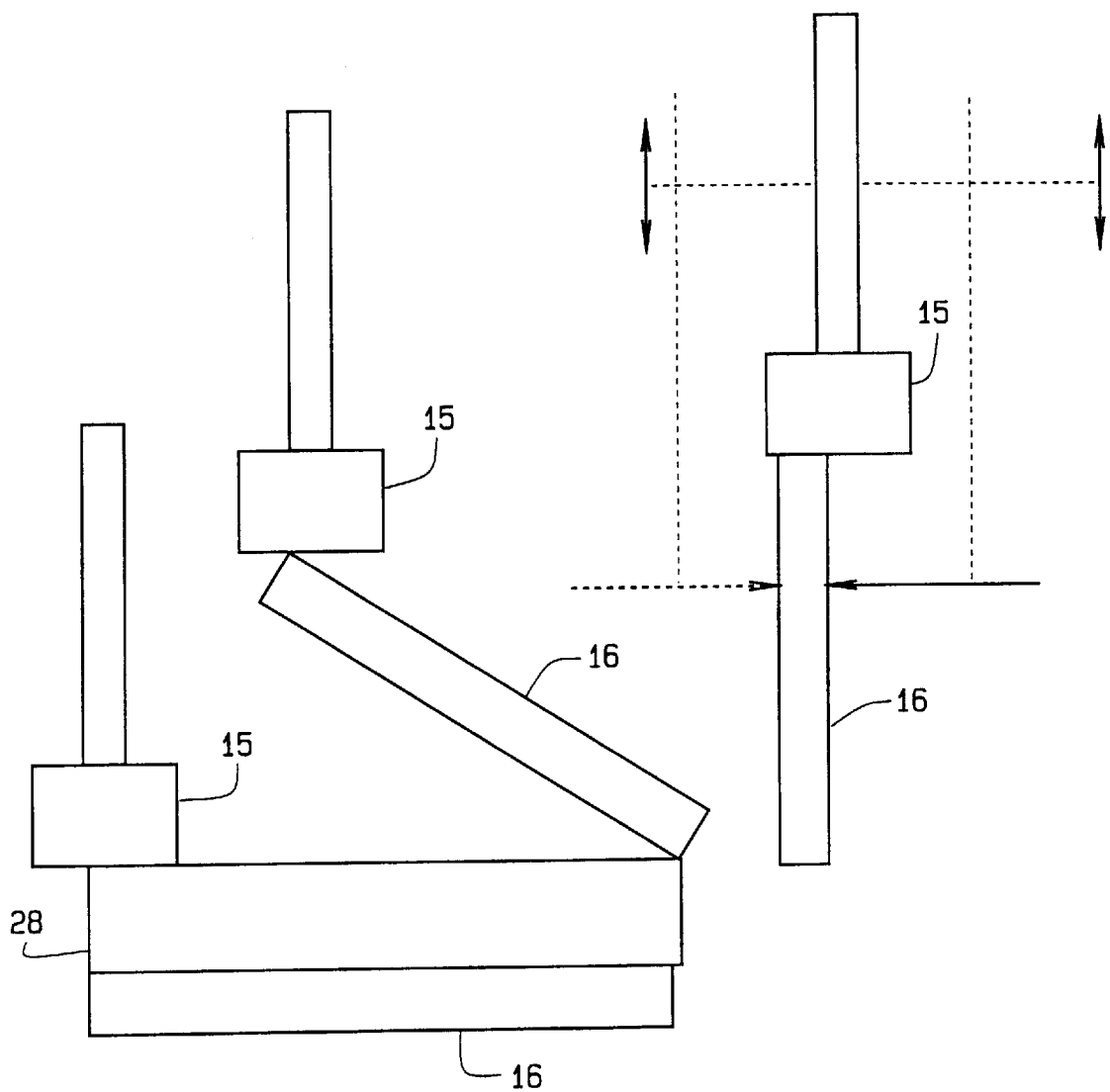
FIG. 4 shows the handling of a slab from its horizontal storage position to its vertical processing position.

If the slabs (16) are cut in a vertical position, slabs (16) to be cut can be piled up at the supplying installation (20) on a cart which carries the edge (28) of the upper slab (16) of the pile of slabs placed under electromagnets (15) which, in service, bracket the edge (28) of the upper slab (16). The electromagnets (15) raise while the cart moves sideways following a course parallel to the vertical movement of the electromagnets (15). This enables the slab (16) to be lifted, by pivoting on its edge (28) in order to come and place itself in a vertical position to be oxygen cut. The rest of the operation is identical that which has been described above for the slab in a vertical position. The evacuation unit deposits cut-up slabs on a pile following the sequence of moves opposite to the supplying moves sequence represented in FIG. 4. The above described lifting of the slabs can also be achieved by keeping the pile of slabs (16) still, but then moving sideways the whole supporting and carrying installation (24) and electromagnets (14) until the electromagnets (14) reach the edge (28) of the upper slab (16) of the pile. The lifting operation then requires that the installation (24), set up for the vertical motion of electromagnets, move sideways.

As various changes could be made in the above constructions without departing from the scope of the invention, it is intended that all matter contained in the above description or shown in the accompanying drawings shall be interpreted as illustrative and not in a limiting sense.

What is claimed is:

1. A process for the oxygen cutting of slabs using one or more oxygen cutting torches, the process comprising the steps of:

hanging the slab (16) using one or more electromagnets (14) separated from the slab (16) by a non-magnetic means;

inducing relative motion between the cutting torches (18) and the slab (16) using a carrying device (15) acting on the slab (16) on the same side as the electromagnet (14);

activating the cutting torch (19) to cut the slab (16) as it comes past the cutting torch (18).

2. The process according to claim 1, wherein the carrying device (15) is a motorized roller with its axis perpendicular to the direction of the motion applied to the slab (16).

3. The process according to claim 2, wherein the non-magnetic means is air.

4. The process according to claim 2, wherein the motorized rollers (15) are magnetized.

5. The process according to claim 2, wherein the motorized rollers (15) are electromagnets.

6. The process according to claim 3, wherein the motorized rollers (15) are magnetized.

7. The process according to claim 3, wherein the motorized rollers (15) are electromagnets.

8. A device for implementing the process of claim 1; the device comprising a slab carrying structure (10), at least one oxygen cutting torch (18), one or more electromagnets (14) attached to said carrying structure (10) and aligned in the moving direction of the slab (16) to suspend a slab (16) above the ground, one or more motorized rollers (15) arranged in the direction of the slabs' transportation with their axis parallel to the direction of transport, to make contact with the slab (16) so as to move said slab in front of the cutting torch, and a nonmagnetic means adjacent to each of the electromagnets (14) and designed to maintain a certain distance between the electromagnet (14) and a slab (16).

9. The device according to claim 8, including a deburring device facing the oxygen cutting torch (19); the slab (16) being positioned, during the oxygen cutting process, between said deburring device and said cutting torch (16).

10. The device according to claim 8, including a slag-granulating device facing the oxygen cutting torch (19); the slab (16) being positioned, during the oxygen cutting process, between the slag-granulator and the cutting torch (16).

11. The device according to claim 9, including by a slag-granulating device facing the oxygen cutting torch (19); the slab (16) being positioned, during the oxygen cutting process, between said slag-granulating device and said cutting torch (16).

12. The device according to one claim 8, including a smoke-evacuating device facing the oxygen cutting torch (19); the slab being positioned, during the oxygen cutting process, between said evacuation device and said cutting torch (16).

13. The device according to claim 9, including a smoke-evacuating device facing the oxygen cutting torch (19); the slab (16) being set, during the oxygen cutting process, between said evacuation device and said cutting torch (16).

14. The device according to claim 10, including a smoke-evacuating device facing the oxygen cutting torch (18); the slab (16) being positioned, during the oxygen cutting process, between said evacuation device and said cutting torch (16).

15. The device according to claim 11, including a smoke-evacuating device (19) facing the oxygen cutting torch (18); the slab (16) being positioned, during the oxygen cutting process, between said evacuation device and said cutting torch.

* * * * *

UNITED STATES PATENT AND TRADEMARK OFFICE
CERTIFICATE OF CORRECTION

PATENT NO.    : 6,534,739 B2
DATED         : March 18, 2003
INVENTOR(S)   : Valerie Donze et al.

It is certified that error appears in the above-identified patent and that said Letters Patent is hereby corrected as shown below:

Column 1,
Line 21, "resplifting" should be -- resplitting --; and
Line 31, "cuffing" should be -- cutting --

Signed and Sealed this

First Day of July, 2003

JAMES E. ROGAN
*Director of the United States Patent and Trademark Office*